(12) United States Patent
Bauch et al.

(10) Patent No.: US 6,595,030 B1
(45) Date of Patent: Jul. 22, 2003

(54) DEVICE FOR GENERATING AN OPTICALLY HOMOGENEOUS, STREAK-FREE QUARTZ GLASS BODY HAVING A LARGE DIAMETER

(75) Inventors: Hartmut Bauch, Weilrod (DE); Hraban Hack, Mainz (DE); Frank Rudiger, Jena (DE); Thomas Schindelbeck, Mainz (DE); Rolf Martin, Jena (DE); Andreas Menzel, Jena (DE); Matthias Schmidt, Jena (DE); Roland Scholz, Jena (DE); Andreas Voitsch, Jena (DE)

(73) Assignee: Schot Glas, Mainz (DE)

( * ) Notice: Subject to any disclaimer, the term of this patent is extended or adjusted under 35 U.S.C. 154(b) by 0 days.

(21) Appl. No.: 09/857,951
(22) PCT Filed: Oct. 12, 2000
(86) PCT No.: PCT/EP00/10050
§ 371 (c)(1), (2), (4) Date: Jul. 3, 2001
(87) PCT Pub. No.: WO01/27044
PCT Pub. Date: Apr. 19, 2001

(30) Foreign Application Priority Data

Oct. 14, 1999 (DE) .......................................... 199 50 321

(51) Int. Cl.[7] ........................... C03B 19/14; C03B 20/00
(52) U.S. Cl. ..................... 65/160; 269/271; 269/484; 269/531
(58) Field of Search ......................... 65/160, 269, 271, 65/335, 355, 356, 484, 531

(56) References Cited

U.S. PATENT DOCUMENTS 4,684,384 A * 8/1987 Berkey ........................ 118/320
4,948,217 A * 8/1990 Keck et al.
5,696,038 A   12/1997 Maxon
5,696,624 A   12/1997 Komine et al.
6,189,339 B1 * 2/2001 Hiraiwa ........................ 65/414

FOREIGN PATENT DOCUMENTS

| DE | 4203287 | 8/1993 | |
| EP | 0720970 | 7/1996 | |
| EP | 0735006 | 10/1996 | |
| EP | 0878451 | 11/1998 | |
| JP | 01-024032 | 1/1989 | |
| JP | 6-234531 | 8/1994 | |
| JP | 07138028 | 5/1995 | |
| JP | 10-87334 | * 4/1998 | ................. 65/531 |
| JP | 11209128 | 8/1999 | |
| WO | WO 97/10182 | 3/1997 | |
| WO | WO 98/40319 | 9/1998 | |

OTHER PUBLICATIONS

Machine Translation of JP 10–87334.*

* cited by examiner

Primary Examiner—James Derrington
(74) Attorney, Agent, or Firm—Jordan and Hamburg LLP (57) ABSTRACT

A device for producing optically homogeneous, streak-free quartz glass bodies having a large diameter including a furnace or melting device having an inner chamber with a pair of openings opposite one another. One or more movable burners are displaceable into one of the openings and the respective glass body to be produced is located in the other opening. Both the burner and glass body are movably positioned. In the course of the production of the quartz glass body, a relative movement is effected in the axial and radial directions between the burner and the quartz glass body such that the distance from the burner outlet opening pertaining to the quartz glass body decreases as the distance from the burner to the X-X axis of the quartz glass body increases.

23 Claims, 4 Drawing Sheets

DEVICE FOR GENERATING AN OPTICALLY HOMOGENEOUS, STREAK-FREE QUARTZ GLASS BODY HAVING A LARGE DIAMETER

BACKGROUND OF THE INVENTION

The present invention relates to a device for generating an optically homogeneous streak-free quartz glass body having a large diameter. In accordance with the invention, bodies made of synthetic quartz glass and having a high homogeneity of their optical properties such as refractive index distribution, transmission, and fluorescence can be manufactured, in particular for use with wavelength under 250 nm.

The transmission and radiation stability required for an application in the UV-range, for example, in excimer lasers or in the microlithography at wavelengths below 250 nm, demands an extremely high purity of the manufactured quartz glass bodies which generally is ensured by a procedure via the gas-phase. In a flame hydrolysis method, a gaseous Si-starting-compound together with oxygen and a fuel gas is converted in a flame to yield $SiO_2$-particles which are vitreously molten to the surface of a quartz glass body heated by a burner.

The increasing demands in the field of microlithography to increase the numerical aperture at a simultaneously high homogeneity of the optical components resulted in the manufacture of larger and larger quartz glass blanks. The quartz glass cylinders conventionally produced by non-displaceably fixing a single burner relative to a surface on which the quartz glass cylinders are molten are, however, limited with respect to the maximum diameters that can be attained. A transformation of the glass cylinders obtainable by this method into disks of expensive and involving the possibility of a negative variation of material, which unfavorably affects transmission and laser stability. Thus, a widening of the deposition range is required for a direct deposition on the desired final format as it is obtained by the conventional use of a plurality of burners or by moving a burner relative to the glass body in a plane normal to the axis of the quartz glass body or by a combination of both methods.

A particularly demanding technological request is to satisfy the requirements for a considerably larger area, which requirements the quartz glass body has to satisfy as they relate to the homogeneity of the optical properties even with larger diameters. This particularly is applicable to the homogeneity of the refractive index distribution with the currently used wavelengths of the mercury vapor lamp (365 nm-i-line and 436 nm-G-line) in microlithography.

Below 250 nm, however, particular consideration has to be given to a constant high transmission to be maintained over the entire optically usable area as well as an excellent damage behavior to be ensured over this area. When these short wavelengths are used, then the irradiation takes place already in the vicinity of the band edge of the glass. Hence, the smallest variations of the structure and the concentration in the glass arising from the manufacture take effect on the glass. Such variations lead to a displacement of the band edge and hence to the transmission below 200 nm with transmission variations in an order of size of some 0.001 $cm^{-1}$ and more (given as decimal absorption coefficient) which is as it relates to microlithography of relevance. As a result of the light scattering, increasing with $\lambda^4$, the diffusion rate for quartz glass, depending on the specific glass structure, lies also in an order of size of some 0.001 $cm^{-1}$.

Additionally, there are numerous intrinsic defects in synthetic glass known, such as Cl-inclusions, OH-groups, oxygen defects etc., having absorption bands in a range between 150 nm and 250 nm. In view these strong dependencies of the transmission below 250 nm from the material properties, significant local transmission variations within a quartz glass body will arise with the conventional manufacturing methods.

Japanese Patent No. 01-024032 describes the deposition of quartz glass in a rotating cylindrical vessel wherein a burner performs a rotating or linear movement to feed a gaseous Si compound as well as the fuel gases. In a further embodiment, a second burner, which exclusively is gas-fueled, is used as an auxiliary heater. The deposition of $SiO_2$ particles in a vessel unavoidably leads to strong variations of the flow conditions which, in turn, lead to variations in the deposition conditions during the process. As a result, there are intense streak formations substantially at right angles to the deposition direction.

In Japanese Patent No. 06-234531, a burner providing $O_2$-compounds, $H_2$-compounds, and an Si-compound is moved in a plane relative to a quartz glass ingot being constructed in accordance with the temperature distribution measured at the ingot head. The temperature distribution detected by an IR- camera is fed into a computer adapted to control an x,y-table, upon which the ingot is mounted.

EP 0 735 006 describes the movement of a quartz glass ingot in the x-direction and y-direction at right angles to the deposition direction of the synthetic quartz glass. The resulting quartz glass contains streaks which substantially lie at right angles to the deposition direction.

U.S. Pat. No. 5,696,038 describes a relative and oscillating motion between a source of $SiO_2$-particles and the quartz glass body being constructed, the motion taking place at right angles to the width of the body at a definite periodicity. There are described in detail cycle periods, which allow a definite minimum layer thickness deposition per cycle, which have a definite minimum duration, and show helically shaped paths or which limit the formation of streaks. The deposition of $SiO_2$ is performed in a flat vessel which is heated from top by a plurality of burners fixed in the upper part of a furnace. The manufactured material contains streaks at right angles to the deposition direction.

European Patent Publication No. EP 0 850 199 relates to those problems caused by the air streams which result from the motion of quartz glass body in a configuration according to U.S. Pat. No. 5,696,038. A method and device is claimed for maintaining a constant air stream about the growing quartz body while the latter performs oscillating movements. The deposition of $SiO_2$ is performed in a flat vessel in analogy to U.S. Pat. No. 5,696,038, which is heated from top by a plurality of non-displaceable burners. The manufactured material also contains streaks at right angles to the deposition direction.

Moreover, with all described prior art solutions, there is, due to the unfavorable flow conditions, the danger of introducing microstructural defects or glass bubbles in the material, apart from streaks.

European Patent Publication No. EP 0 720 970 discloses a quartz glass having a structure temperature of less than or equal to 1200 K, an OH-content of at least 1000 ppm, and an internal transmission of at least 99.6% at 193 nm. However, it does not discuss the steadiness of the transmission over the face of a quartz glass body.

U.S. Pat. No. 5,696,624 describes protection for a quartz glass of an internal transmission of greater than 99.9% per 1 cm sample thickness across a diameter of at least 150 mm before and after bombardment with 106 pulses of an ArF-laser. It is well-known that the internal transmission in the UV range can only be exactly measured by large expenditures. Any kind of surface contamination and surface defects (for example, by polishing) results in a severe reduction of the UV transmission that with highly transparent material makes up a multifold of the measuring effect of the internal transmission. For this reason, the purification of the samples gets a predominant significance. There is no reference to that problem in the above-cited publication. Generally, surface effects can be eliminated by carrying out thickness-dependent series of measurements.

In the measuring method described in U.S. Pat. No. 5,696,624 two samples having lengths of 2 mm and 12 mm were used. There is used a dual-beam spectrophotometer, the publication has, however, no reference to a purging of the spectrometer with a purging gas being non-absorbing in the UV-range, for example, $N_2$, this being necessary according to the prior art. This not being carried out will lead to a falsification of the transmission towards higher values, due to the UV absorption by oxygen. The determination of the transmission at 193 nm is related to that at 365 nm, the value of which is arbitrarily set to 100% for the internal transmission. Such a measuring is obviously improper, since the given internal transmissions of greater than 99.9% $cm^{-1}$ are physically not reasonable.

In U.S. Pat. No. 5,696,624, the internal transmission is, as generally used, defined as the spectral transmission measured minus the reflection losses at the surface. As generally known, the dispersion losses in the UV, which increase with the fourth power of the wavelength, significantly contribute to the losses of internal transmission. So, for example, a dispersion loss of the transmission of at least 0.18% related to one centimeter is given in the already mentioned EP 0 720 970; Lieberman et al, in Opt. Lett., Vol. 24 (1999), pg. 58–60 states a decimal volume dispersion coefficient of 0.0008 $cm^{-1}$, which also corresponds to a transmission loss of 0.18% related to one centimeter. Alone by this dispersion amount, even without additional absorption rates from the range of the absorption edge or from intrinsic defects which, as explained above, add a not insignificant amount at the wavelengths considered, a transmission of 100% is exceeded in a physically non-reasonable manner.

In International Publication No. WO 98/40319, a deposition melting device, working according to a horizontal method, is described, by which a good optical homogeneity, a high transmission, a low fluorescence, and a high laser stability can be achieved. This deposition melting device substantially has a rotation symmetrical design, exhibits a favorable distance between its interior shape and the cap of the quartz glass body to be deposited by melting, and comprises a geometry which favorably effects the heat economy in the device.

The diameter of the manufactured streak-free pre-forms is, however, comparatively small, so that the pre-form has to be work-expensively thermally transformed in order to obtain larger final products.

SUMMARY OF THE INVENTION

Therefore, it is an object of the present invention to provide an arrangement which allows production of pre-forms from streak-free quartz glass having large diameters (preferably >180 mm), whereby the quartz glass over its entire diameter exhibits a high homogeneity of is the optical properties (refractive index distribution, transmission, fluorescence), but no micro-structural defects. Streaks or striations are here referred to as all local variations of the refractive index in an order of size that can be visually detected and by means of the shadow method, respectively, or in a similar direct manner. The term "streak free" refers to streaks or striations extending in at least one spatial direction within the glass, preferably, in parallel to the optical axis of the quartz glass body, whereby the optical axis is centrally extending in the quartz glass body in the deposition direction of the same.

According to the invention, the object is realized by an apparatus for generating optically homogeneous streak-free quartz glass bodies having large diameters which comprises a melting device having an inner space provided with first and second opposing openings, at least one burner arranged in the first opening, a quartz glass body having an axis X-X displaceably arranged in the second opening and means capable of providing relative movement between the burner (s) and the quartz glass body in an axial direction and in a radial direction such that the distance between the burner(s) and the quartz glass body is reduced with an increasing distance of the burner(s) from the X-X axis of the quartz glass body during generation of an optically homogeneous streak-free body.

The invention allows manufacture of pre-forms having large diameters from synthetic quartz glass by the flame-hydrolysis method, whereby the quartz glass body over its entire diameter exhibits, with the exception of a small rim portion, a very good refractive index homogeneity and a uniformly high transmission.

According to the invention both, the burner and the quartz glass body can be involved in the relative motion between the two. When the relative motion is carried out only by the burner, then the interior shape of the melting device (muffle) can be very easily adapted to the desired shape of the glass. In the easiest case, the reduction of the distance between the burner exit opening ($SiO_2$-source) and the increasing diameter of the pre-form takes place linearly to the radial distance of the point of impingement of the flame from the axis of rotation of the pre-form. The final value of the radial distance in the rim-portion shall not be smaller than 65% of the central near-axial is distance. In this manner, the different thermal conditions and deposition conditions in the rim portion of the developing quartz glass body are taken into account. These differences are attended to by way of respective different procedure defaults with respect to the interior range and the exterior range of the quartz glass body. For this, the distance reduction between the burner exit opening and the glass body is decisive.

The following investigations have been carried out in the course of working out the arrangements in accordance with the invention:

measuring of the field of speed in the interior of the flame by way of laser-Doppler-anemometry, measuring of the temperature field in the interior of the flame by way of Raman-spectroscopy, measuring of the particle distribution in the interior of the flame by way of Rayleigh-radiation.

It was found that both the absolute values and the distribution of these measured variables are varying in a wide range as a function of the distance between the burner exit opening and the deposition surface and therefore can be utilized in a specific checking and control of the deposition process. Moreover, information, obtained from the Raman measurement and from chemical balancing computations, about the local chemical compositions in the burner flame open up the possibility of a correspondingly favorable setting of the concentrations of the intrinsic contaminations, for example, by Si—OH-groups or Si—Cl-groups etc. In this manner, unfavorable temperature distributions and flow conditions and, hence, the formation of streaks or bubbles are avoided across the entire cross-section having a diameter or an edge length of at least 15 cm.

The high optical homogeneity and transmission in the external range or in the rim portions of the quartz glass body will be favorably influenced when the relative motion between the burner and the glass body is accompanied by a setting of the angle and by varying the angle, respectively, between the axis of the burner and the axis of the glass body. The two axes are inclined towards each other in the deposition device in direction of the ejected fuel gas, without the necessity of having an intersection point with each other. That is, they also can be obliquely directed relative to each other and must not have common plane. In the case of strongly sloping rim portions of the quartz glass body, only then when there is an angular position of the burner axis relative to the axis of the quartz glass body, the reduction of the distance between the burner and the glass body to the required measure can be realized. The mentioned variation of the angle preferably will lie between 0° and 60°.

In a preferred embodiment according to the present invention, the angle between the axis of the burner and the optical axis of the quartz glass body will increase uniformly monotonous with an increasing distance of the point of impingement of the flame from the axis of the quartz glass body. It contributes to the realization of the object of the invention, when there is a rotational movement performed by the preferably cylindrical perform, and when this rotational movement is integrated into the path of motion of the burner. In this manner, the expenditures for displacement units and control mechanism can be reduced. A correspondingly designed link motion device can be used to control the path of motion of the burner.

It is, however, advantageous when the control is performed with the aid of a robot or by a cross-slide system controlled by a computer. In this manner, a motion of the burner along three coordinates is ensured. Additionally, the burner is displaceably seated on the cross-slide system and at the robot lever, respectively, in parallel to its axis. In order to avoid undesired heat losses during the melting process, a displaceable stop is attached opposite the muffle for closing the associated opening of the muffle. It is also possible to provide a plurality of such stops in the muffle opening, which can be controlled simultaneously, simultaneously and/or independently from each other.

In view of diffusion, there will develop significant variations in concentration of the mentioned contaminations in the cooling phase of the manufactured quartz glass body and in a subsequent annealing process, if required. For this reason, a concentration distribution is preferably to be kept to across the melting area, in which subsequent concentration variations, due to diffusion, have already been included, so that a substantially uniform distribution will be attained for the final product. It was found by the investigations carried out with regard to the invention that, in order to render the optical properties homogeneous in the developing quartz glass body, there is required a special control of the deposition conditions including a defined insertion of desired structural effects by way of an adaptation of the temperature conditions and the flow conditions as well as of the stoichiometry of the flame in the impinging area of the flame. In order to simultaneously optimize all these parameters, the arrangement according to the present invention is particularly suited by moving the burner ($SiO_2$-source) in direction of the axis of the quartz glass body, which preferably has a cylindrical shape, in dependence on the radial position of the burner relative to the quartz glass body.

A quartz glass body manufactured in accordance with the arrangement as of the present invention has a refractive index homogeneity of <±1 ppm over at least 50% of its diameter, which is 180 to 500 mm. It exhibits an internal transmission of at least 0.995 at a wavelength of ë=193 nm related to a width of 1 cm.

BRIEF DESCRIPTION OF THE DRAWINGS

The invention will be explained hereinafter in more detail by virtue of drawings showing sectional views of five embodiments. There is shown in.

DESCRIPTION OF THE PREFERRED EMBODIMENTS

Figure 1:
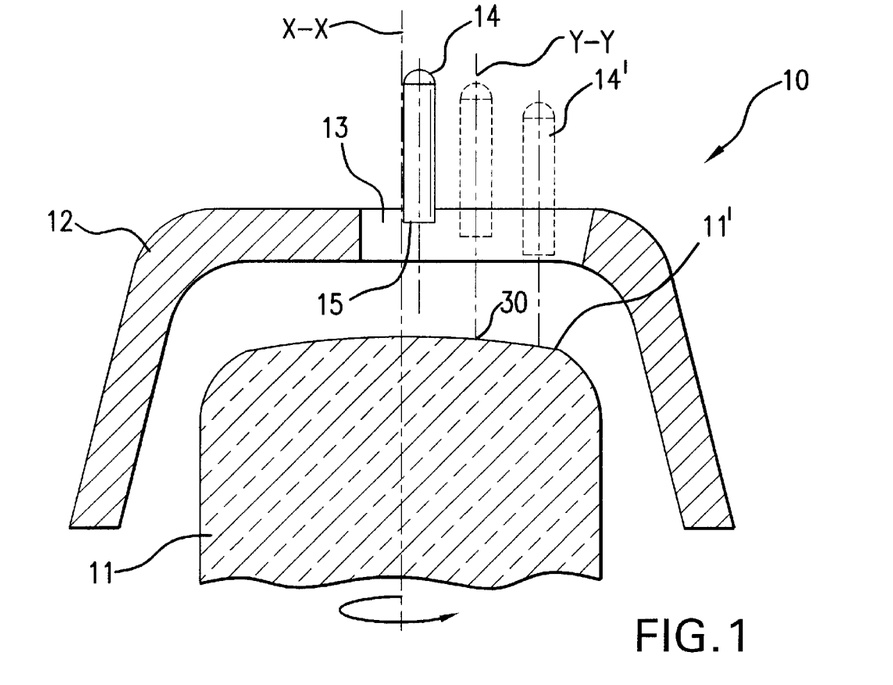
FIG. 1 shows essential parts of a first embodiment of the present invention.

Referring to FIG. 1, there is partially shown an arrangement 10 for producing an optically homogeneous streak-free quartz glass body 11 (cylinder) with a melting face or deposition face 11', the quartz glass body 11 being seated for rotation about an axis X-X. The quartz glass body 11 is enclosed by a partially shown muffle 12 (melting furnace), which is provided with an opening 13 for a burner 14, the longitudinally extending axis of which is designated by Y-Y. The axis of rotation X-X and the longitudinally extending axis Y-Y are aligned in parallel to each other and variable as concerns their mutual distance. The axis Y-Y intersects the deposition face 11' in a point 30, which is the point of impingement of the burner flame. The distance between the burner exit opening 15 and the quartz glass body 11 is also variable, with the burner exit opening being arranged opposite the quartz glass body.

In the course of the melting process, $SiO_2$ is melted with a respective doping from OH-groups and Cl-groups and others, if required, on the continuously rotating quartz glass body 11 by aid of the burner 14 and, added to the latter, by the $SiO_2$-source. The rotation frequency of the quartz glass body 11 is 5 min$^{-1}$ and the duration of period is 100 s, in which the burner 14 reciprocates from its near-axial end position remote from the quartz glass body to an external end position 14' nearer to the quartz glass body. In the near-axial end position, the distance between the burner exit opening 15 and the quartz glass body 11 is 250 mm, and in the external end position the distance is 200 mm. It is understood that the given values for the distance are exemplary values.

In view of the, on average, shorter distances between the $SiO_2$-source 14 and the deposition surface 11' of the quartz glass body 11, a higher maximum temperature can be realized in the impinging range by use of the arrangement according to FIG. 1, provided that a suitable geometry for the burner nozzle and appropriate gas volume streams for the individual nozzles of the burner have been selected. In this manner, the greater heat radiation emission in the rim portions is compensated for. Furthermore, the momentum of the flow is greater with a shorter length of the flame and, hence, the danger of undefined flow conditions is reduced, this danger being particularly great in the rim portion of the quartz glass body 11 in the vicinity of the muffle 12 wall and otherwise leads to the formation of bubbles and streaks. The typical outline of the quartz glass body 11 shows a curved profile at the rim portion. This, with the conventional methods, actually causes an extension of the distance to the burner in these rim portions, rather than reducing the same, so that the rim effects of the optical properties are intensified in an undesired way. This is counteracted by the described variation of the burner position along the axis Y-Y of the burner in direction of the quartz glass surface 11'.

A polynomial analysis of the interferometrically measured refractive index distribution is used to precisely characterize the refractive index distribution and its rim effects. Rotation-symmetrical values of the nth order will result therefrom and angular dependent values which represent, for example, coma and astigmatism. With the increasing order of the polynomials, the number of the points of inflection also increase in the individual symmetry elements, that is, there are increasingly described small-spatial local refractive index variations. Since the individual values of the polynomials have respective different effects on the optical imaging properties, they are specified differently. The results of the nm portion effects of the refractive index distribution are directly reflected in the value of the individual polynomial coefficients.

Figure 2:
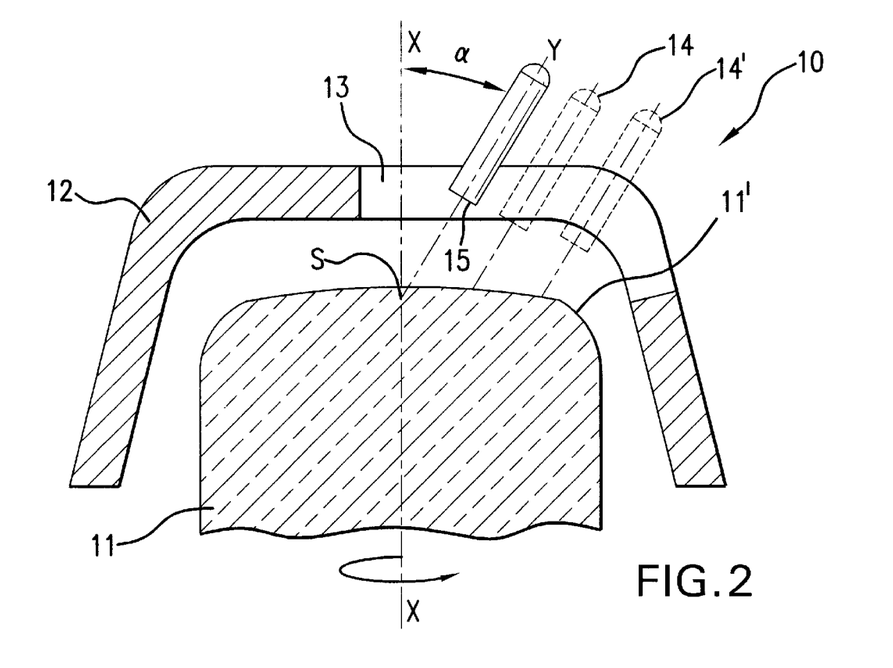
FIG. 2 shows essential parts of a second embodiment of the present invention.

In FIG. 2 and at an otherwise same design, the axis Y-Y of the burner 14 is inclined by an angle α relative to the axis X-X of the quartz glass body 11, whereby α is between 0 and 45°. The distance of the burner exit opening 15 to the quartz glass surface 11' decreases with an increasing distance of the burner 14 from the axis X-X. The set angle α between the burner axis Y-Y and the axis X-X of the quartz glass body 11 is defined by a vertex S which lies in direction of the emitted burner gas and in which the extension of the burner axis Y-Y intersects the axis of rotation X-X or in which the two axes have the shortest distance to each other at an oblique position.

In favorable embodiments which will still be described hereinafter, the angle α can monotonously increase from 0 to 60° at an increasing distance of the point of impingement of the flame from the axis of the quartz glass body. The high homogeneity and the transmission in the is rim portion will profit therefrom, when the relative movement between the burner and the quartz glass body is simultaneously associated to an angular variation between the burner axis Y-Y and the axis of rotation X-X.

In order to keep the variations of the flow conditions in the muffle chamber 16 as low as possible during the relative movement between the $SiO_2$-source and the deposition face 11' on the quartz glass body 11, preferably the $SiO_2$-source itself, that is, the burner 14 will be moved, as is shown in FIG. 1 and 2. In this manner, the interior face of the muffle 12 will directly adapt to the profile of the quartz glass body 11, and there is no need for an additional space as is the case, for example, when the entire glass body 11 is moved. Moreover, the movement of large masses and the displacement mechanisms required thereto is avoided. In consequence thereof, the possible maximum displacement speed can be increased and the probability of intrinsic oscillations of the entire arrangement can be reduced.

Furthermore, and according to the present invention there is an embodiment in which not only a constant number of rotations of the quartz glass body 11 is, by virtue of a control program, associated to the path of motions of the burner 14, but the number of rotations of the quartz glass body also is variable in dependence on the radial position of the point of impingement of the flame. In this manner, the number of rotations of the quartz glass body 11 is generally the lowest when the point of impingement of the flame has its greatest radial distance from the axis X-X, and it is the greatest when the distance of the point of impingement of the flame from the axis X-X is a minimum. It is, for example, favorable to have the number of rotations varying by the control program between a minimum of 2 $min^{-1}$ and a maximum of 30 $min^{-1}$. However, the path of motions of the burner 14 can also be controlled such that the quartz glass body 11 must not rotate (refer to FIG. 4 and 5). Thus, the expenditures for displacement mechanisms and control techniques can be further reduced.

An arrangement according to the present invention, which is low cost, will be obtained when the burner, the muffle, and the axis of the quartz glass body are substantially horizontally arranged, since this permits the use of conventional rotary seats for supporting and rotating the quartz glass cylinder (when the latter is a rotating one).

Figure 3:
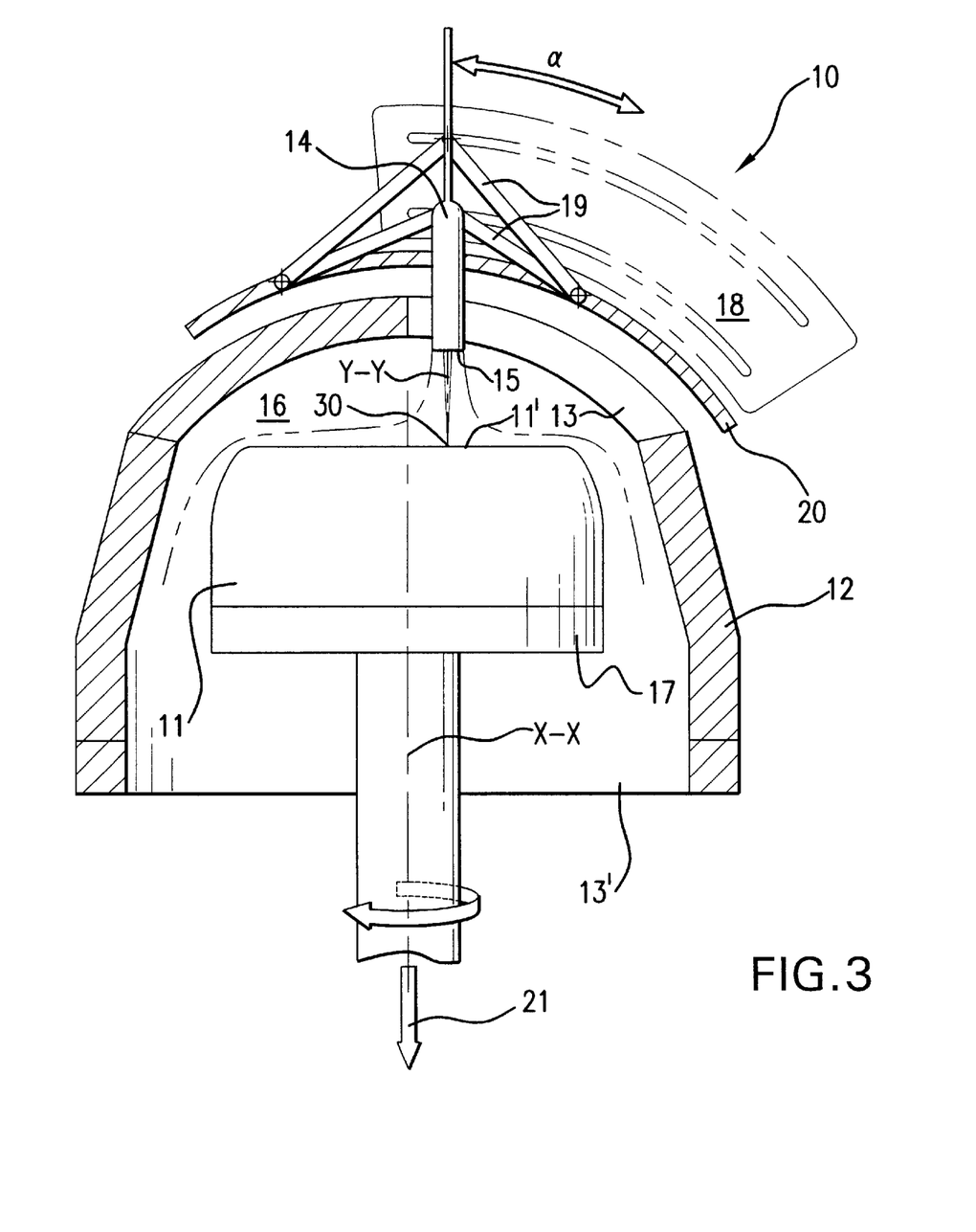
FIG. 3 shows a third embodiment of the present invention with a link motion device guiding.

Referring to FIG. 3, an arrangement 10 is shown for manufacturing an optically homogeneous and streak-free quartz glass body 11 in the inner space 16 of a muffle 12, whereby the quartz glass body is mounted on a disk 17 rotating about an axis X-X and is displaceable in parallel to the axis X-X. This displacement of the disk 17 designated by an arrow 21 takes place in accordance with the deposition of the quartz glass body 11. The muffle 12, on the one hand, has an opening 13, in which at least one burner 14, having an opening 15, and a burner having one or a plurality of nozzles, respectively, is displaced by operation of a link motion device 18 via connecting rods 19. On the other hand, the muffle 12 is provided with an opening 13' via which the quartz glass body can be removed from muffle. The opening 13' is greater than the opening 13 and is arranged in opposition to the opening 13. By varying the distance of the point of impingement of the flame 30 from the axis X-X of from 0 cm to 15 cm, the link motion device 18 effects a variation of the angle α defined by the axes X-X and Y-Y from 0° to 35°, as well as a variation of the distance of the burner opening 15 to the point of impingement of the flame 30 from 30 cm to 18.5 cm.

The burner 14, which is displaceable and supplies an Si-compound and the burner gases, is connected to a stop 20. The stop 20 closes the area of the opening 13 which is not occupied by the burner 14 and thus eliminates undesired heat dissipations as far as possible. The opening 13 and the link motion device 18 can also extend over the entire quartz glass body 11, that is, along both sides of the axis X-X in FIG. 3. As to the remaining aspects, the previously disclosed material is valid for this embodiment in its general sense.

Figure 4:
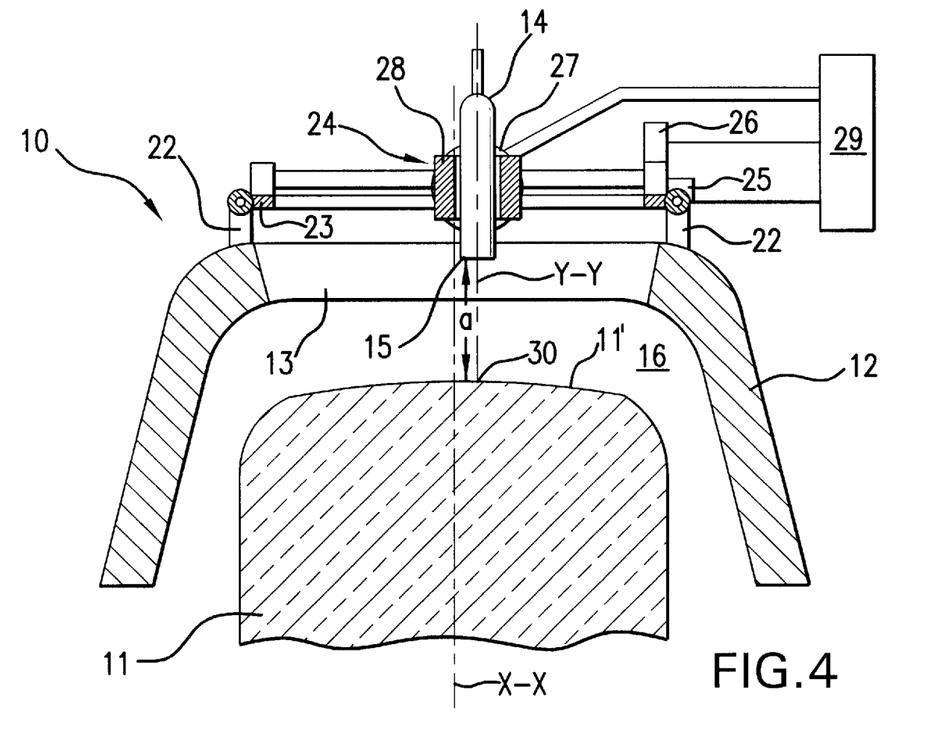
FIG. 4 shows a fourth embodiment of the present invention with a cross-slide system guiding.

Referring to FIG. 4, the essential parts of an arrangement 10 according to the invention are represented. A pre-form 11 having an axis X-X, which coincides with the geometrical axis of a melting device 12, is arranged in the inner space 16 of the melting device 12 which has an opening 13. Furthermore, the pre-form in the melting device 12 is being moved by the deposited amount of melt, in parallel to the axis X-X, in the melting device 12. At least one support 22 is provided on the outside of the melting device 12 for mounting a cross-slide system 23, 24, which is arranged for displacement by means of drive means 25, 26, the supporting slide 23 being displaceable in parallel to the drawing plane and the supported slide 24 being displaceable at right angles to the drawing plane. To the supported slide 24, a pivot means 27 is attached, to which, in turn, a longitudinal displacement device 28 is attached, which is provided for supporting a burner 14. By means of this longitudinal motion device, the burner 14 with and by its axis Y-Y can be inclined relative to the axis X-X, and a distance a between the opening 15 of the burner and the melting face 11' can be adjusted.

This distance a is exactly to be understood as the space between the burner opening 15 and the point of impingement of the flame 30. As it decreases, the greater is the distance of the point of impingement of the flame from the axis X-X. In the present example, the distance a of the burner opening 15 at the greatest possible distance of the point of impingement of the flame 30 from the axis X-X is 0.6 a and the associated angle $\alpha=35°$. The drive means 25, 26 for the slides as well as for the pivot means 27 and the longitudinal displacement device 28 are connected via respective lines to a control unit 29 for controlling the individual movements, to provide for a computer-aided control of the individual drive means independently from each other.

The control unit 29 including a computer does not only allow the integration of the rotation of the quartz glass body 11 about the axis X-X into the burner motion, but also provides for the condition to avoid periodical structures which would affect refractive index inhomogeneities. To this end, the previously described movements of the burner 14 in a plane at right angles to the axis X-X are, for example, superimposed by an, in the average, non-periodical random motion by the aid of a suitable computer program.

Figure 5:
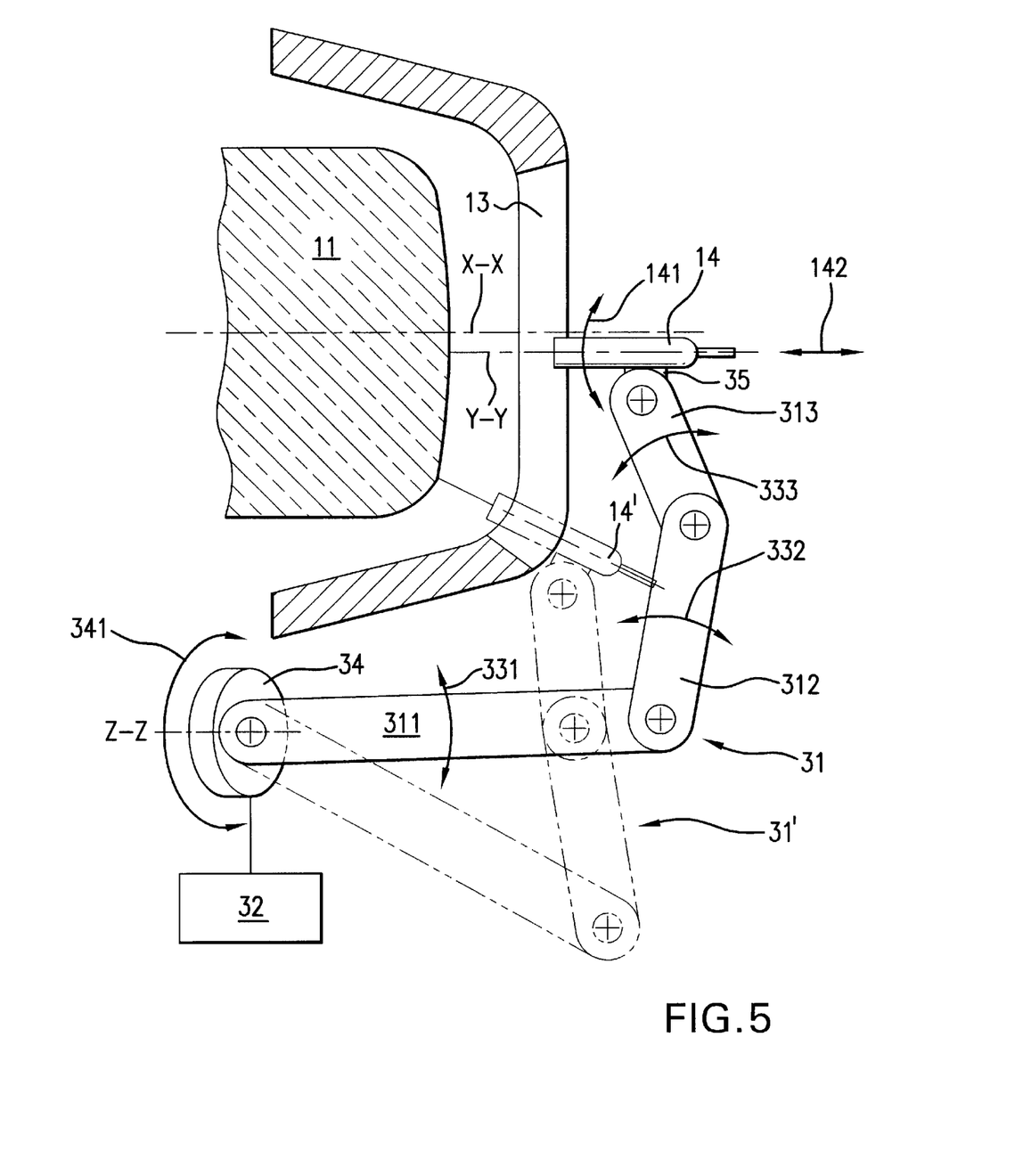
FIG. 5 shows a fifth embodiment of the present invention provided with a robot.

Referring to FIG. 5, a tripartite robot arm 31 with a corresponding control 32 for all movements is provided instead of the cross-slide system 23, 24 of FIG. 4. The link elements 311, 312, 313, as indicated by the corresponding double arrows 331, 332, 333, can be mutually pivoted. The robot lever 31 is hinged to a support 34 and, together with the support, is seated for rotation about an axis Z-Z in directions indicated by a double arrow 341. The axis Z-Z preferably is parallel to the axis X-X of a quartz glass body 11. The glass body 11 is substantially coaxially enclosed by a muffle 12 which has an opening 13 in which a burner 14 can be moved, the burner 14 being hinged via an intermediate element 35 to the free end of the robot lever 31. The displacement of the burner 14 into, for example, a rim position 14' in which the robot lever takes the position 31', is performed, on the one hand, by the pivot movements of the link elements 311, 312, 313 and, on the other hand, by the displaceable arrangement of the burner 14 attached to the free end of the robot lever 31, the arrangement being allowed to pivot in the direction of a double arrow 141 and to be linearly displaced in direction of a double arrow 142. As a result of the burner displacement, the distance of the burner 14 to the quartz glass body 11 is significantly reduced and also the angular position of the axis Y-Y to the axis X-X is distinctly varied.

A stop for preventing heat radiation losses, and which is not shown for the sake of clarity, can be connected to the intermediate element 35 and can be moved together with the intermediate element 35. The arrangement shown in FIG. 5 is accompanied by a further reduction of the expenditures for displacement units and control techniques.

The cross-slide system 23, 24 or the robot 31 can also be used when in spite of somewhat higher costs in realizing the rotation of a quartz glass body the technological advantages of a resulting homogenization of the melting on the melting surface 11' of the quartz glass body 11 can be utilized.

When, according to the present invention, the movement of the burner relative to a rotating quartz glass body is carried out by a procedure in radial direction (for example, similar to that in FIG. 3), then the implementation of a stop can be omitted. This omission which requires a suitable operating mode and is due to the involved smaller and slit-shaped opening 13 in the muffle 12 will take place without any significant heat radiation losses.

In order to increase the feeding-in of heat and $SiO_2$, the described devices can be provided with a plurality of burners which are mounted for simultaneous displacement in a non-varied position relative to each other or they can be mounted for displacement independently from each other.

All features disclosed in the specification, in the subsequent claims, and represented in the drawings can be substantial for the invention individually, but also in combination with one another.

What is claimed is:

1. An apparatus for generating optically homogeneous streak-free quartz glass bodies having large diameters, comprising;
   a melting device having an inner space, said inner space being provided with first and second opposing openings;
   at least one burner arranged in said first opening;
   a quartz glass body having an axis X-X displaceably arranged in said second opening; and
   means capable of providing relative movement between said at least one burner and said quartz glass body in an axial direction and in a radial direction such that the distance between said at least one burner and said quartz glass body is reduced with an increasing distance of said at least one burner from the X-X axis of said quartz glass body during generation of an optically homogeneous streak-free body.

2. An apparatus as claimed in claim 1, wherein an axis Y-Y of said at least one burner and the axis X-X of said quartz glass body are inclined towards each other in said melting device.

3. An apparatus as claimed in claim 2, wherein the inclination of said at least one burner increases with radial distance of an impingement point of a flame of said at least one burner from the axis X-X of said quartz glass body.

4. An apparatus as claimed in claim 1, 2 or 3, further comprising a link motion device for controlling movement of said at least one burner.

5. An apparatus as claimed in claim 1, 2 or 3, further comprising a cross-slide system for effecting movements of said at least one burner at right angles to the axis X-X.

6. An apparatus as claimed in claim 5, further comprising pivot means for enabling pivotal movement of said at least one burner relative to said cross-slide system and a longitudinal displacement device for enabling longitudinal displacement of said at least one burner on said cross-slide system.

7. An apparatus as claimed in claim 4, further comprising a control unit including a computer for controlling the movement of said at least one burner.

8. An apparatus as claimed in claim 1, 2 or 3, further comprising a robot for controlling the movement of said at least one burner.

9. An apparatus as claimed in claim 1, wherein said quartz glass body is rotatable about the axis X-X.

10. An apparatus as claimed in claim 1, 2 or 3, further comprising a stop fixedly connected to said at least one burner, said stop being arranged to close said first opening.

11. An apparatus as claimed in claim 1, wherein said at least one burner comprises a plurality of burners, said burners being displaceable simultaneously or independently from each other.

12. An apparatus as claimed in claim 1, wherein said apparatus is positioned such that the axis X-X assumes a horizontal position at least during the melting process.

13. An apparatus for generating optically homogeneous streak-free quartz glass bodies having large diameters, comprising;
- a melting device defining an inner space having first and second opposing openings;
- at least one burner displaceable into said first opening;
- a quartz glass body defining an axis X-X and projecting into said inner space of said melting device through said second opening; and
- movement means for providing relative movement between said at least one burner and said quartz glass body in an axial direction and in a radial direction such that the distance between said at least one burner and said quartz glass body is reduced with an increasing distance of said at least one burner from the X-X axis of said quartz glass body during generation of an optically homogeneous streak-free body.

14. An apparatus as claimed in claim 13, wherein an axis Y-Y of said at least one burner and the axis X-X of said quartz glass body are inclined towards each other in said melting device.

15. An apparatus as claimed in claim 14, wherein the inclination of said at least one burner increases with radial distance of an impingement point of a flame of said at least one burner from the axis X-X of said quartz glass body.

16. An apparatus as claimed in claim 13, wherein said movement means comprise a link motion device for controlling movement of said at least one burner.

17. An apparatus as claimed in claim 13, wherein said movement means comprise a cross-slide system for effecting movements of said at least one burner perpendicular to the axis X-X.

18. An apparatus as claimed in claim 17, wherein said movement means further comprise pivot means coupled to said at least one burner and said cross-slide system for enabling pivotal movement of said at least one burner relative to said cross-slide system and a longitudinal displacement device for moving said at least one burner along said cross-slide system.

19. An apparatus as claimed in claim 17, further comprising a control unit for controlling the movement of said at least one burner on said cross-slide system.

20. An apparatus as claimed in claim 13, further comprising a robot for controlling the movement of said at least one burner via said movement means.

21. An apparatus as claimed in claim 13, wherein said quartz glass body is rotatable about the axis X-X.

22. An apparatus as claimed in claim 13, further comprising a stop fixedly connected to said stop being arranged to close said first opening.

23. An apparatus as claimed in claim 13, wherein said at least one burner comprises a plurality of burner, said burners being displaceable simultaneously or independently from each other.

* * * * *